J. MOELLER.
Horseshoe-Nail.
No. 218,302. Patented Aug. 5, 1879.
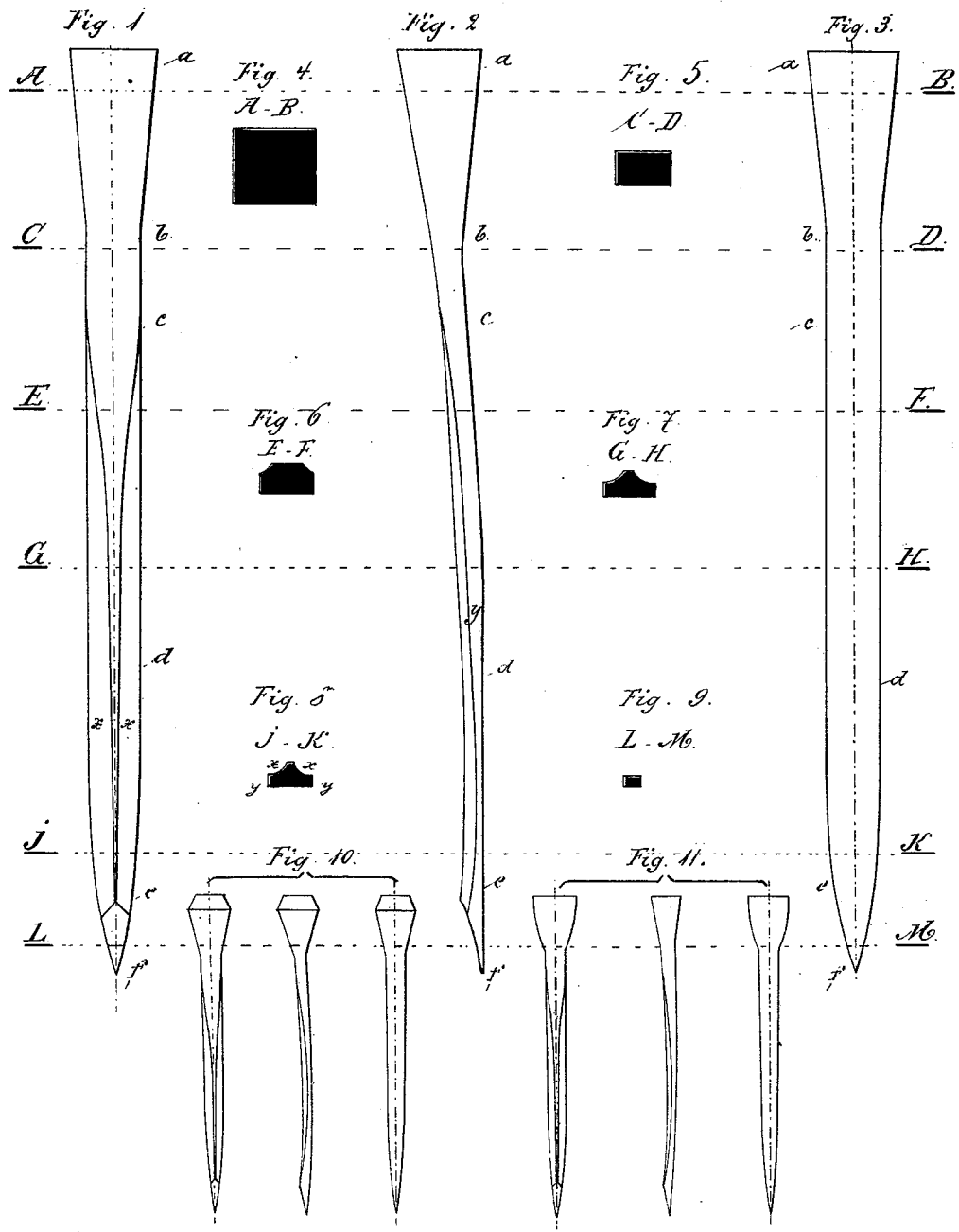

UNITED STATES PATENT OFFICE.

JULIUS MOELLER, OF BERLIN, PRUSSIA.

IMPROVEMENT IN HORSESHOE-NAILS.

Specification forming part of Letters Patent No. 218,302, dated August 5, 1879; application filed November 26, 1878.

*To all whom it may concern:*

Be it known that I, JULIUS MOELLER, of the city of Berlin, Kingdom of Prussia, have invented certain Improvements in Horseshoe-Nails, of which the following is a specification.

The object of the present invention is to furnish horseshoe-nails which will not rupture or tear the hoof when they are driven into the same, and will also possess the power of easier penetration than the ordinary nails.

The invention consists in making the shank of the nail in the form of a bayonet, or, in other words, providing the shank of the nail with a flat bottom surface, and with a top surface having a central rib, and a concave surface on each side thereof.

In the accompanying drawings, Figures 1, 2, and 3 are enlarged front, side, and rear views of a nail constructed according to my invention. Figs. 4 to 9, inclusive, are cross-sections taken through different portions of the nail-shank on the lines indicated. Figs. 10 and 11 represent natural-sized nails having different-shaped heads.

The head $a$ $b$ is of any desirable form, and is likewise, with the upper part, $b$ $c$, of the shank, made rectangular in cross-section, so that the nail-hole in the shoe will be completely filled and enable the nail to be firmly held therein.

The portion of the nail entering the hoof, extending from the tip of the point $f$ to the portion of the shank marked $c$, is of a bayonet form—that is, it is made triangular in cross-section, with suitable blunted corners.

The front side surfaces, $x$, of the nail-shank are hollowed out, or made concave, and the central rib formed by these concavities increases in sharpness from the point $c$ to the point $d$.

The part $e$ $f$ of the shank constitutes the penetrating-point or clinch portion of the nail. This clinch portion or point can be beveled off in the same manner as the shank proper; but this is not deemed essential, and I have left the point flat, as is seen in the drawings.

By the form given to the nail-shank, as herein described, the splitting or rupture of the hoof is absolutely prevented, and the penetration of the nail is facilitated.

The following points of advantage over ordinary nails may be mentioned:

The nail can be driven into the hoof with small labor and force, the peculiar form thereof facilitating the easy penetration.

The end of the nail which appears on the outer surface of the hoof can be easily nipped off, because this portion is quite thin, and for the latter reason the clinching of the nail is also made more easy than in ordinary nails.

The nail, by reason of its peculiar form, takes the proper outward course with more certainty than an ordinary nail.

The hollowed-out or concaved beveled surfaces of the shank effect a larger contact-surface between the nail and the hoof, (the inside of the latter,) so that the nail will be embedded more firmly therein.

In my nail the side edges thereof (indicated by the letter $y$) are not sharp, but are flattened, so as to preclude the possibility of the breaking of the nail, as would be the case if the side edges were sharp.

For adding strength to the nail and facilitating the penetration thereof, the central rib formed between the concaved side surfaces is made sharp or angular near the point, and it gradually widens and becomes more flat toward the upper portion of the shank.

The rear surface of the nail is purposely formed flat, because the same will lie more firmly against the hoof when clinched down than if this rear surface were beveled off. The aforesaid rib will come on the outside of the nail when the same is clinched and insures the proper strength and permanency of the clinched portion.

My nail is specially adapted for carrying out the method of shoeing in which the nail is driven through the hoof in the direction of the breadth thereof.

Any suitable form of head may be used in connection with my improved form of shank, and the entire nail may be made by hand or machinery.

I am aware of the English Patent No. 4,067, granted A. D. 1874, which relates to nails for various purposes made triangular in cross-section, but provided with flat surfaces and sharp angles.

I also disclaim a horseshoe-nail having a triangular point and an ordinary-shaped shank; but What I do claim, and desire to secure by Letters Patent, is—

The horseshoe nail having a flat rear surface, flattened or blunted side edges, two lateral concaved front surfaces, and a central rib between the latter, decreasing in sharpness and increasing in breadth from the penetrating-point toward the upper rectangular-shaped portion of the shank, or the portion which remains in the shoe, as and for the purpose herein set forth.

In testimony whereof I have signed my name to this specification in the presence of two subscribing witnesses.

JULIUS MOELLER.

Witnesses:
 GERARD VON NAWROCKI,
 EDWARD P. MACLEAN.